United States Patent [19]

Le Roux et al.

[11] 4,335,883

[45] Jun. 22, 1982

[54] SEALING DEVICE FOR A COMPONENT VERTICALLY DISPOSED WITHIN THE PRIMARY VESSEL OF A NUCLEAR REACTOR

[75] Inventors: Jean Le Roux, Verrieres le Buisson; Andre Plagnard, Montrouge, both of France

[73] Assignee: Novatome, Le Plessis, France

[21] Appl. No.: 142,847

[22] Filed: Apr. 22, 1980

[30] Foreign Application Priority Data

Apr. 27, 1979 [FR] France ................................. 79 10740

[51] Int. Cl.³ ..................... F16J 15/06; F16J 15/40; B65D 45/16
[52] U.S. Cl. ........................................... 277/3; 277/2; 277/12; 277/53; 277/59; 277/72 R; 277/101; 277/105; 220/378
[58] Field of Search .................... 277/3, 12, 105, 106, 277/58, 59, 53, 101, 71, 72 R, 72 FM, 178, 2; 220/378

[56] References Cited

U.S. PATENT DOCUMENTS

| | | | |
|---|---|---|---|
| 3,141,685 | 7/1964 | Watts | 277/3 X |
| 3,279,644 | 10/1966 | Robertson et al. | 220/378 X |
| 3,642,289 | 2/1972 | Basham et al. | 277/58 X |
| 3,975,991 | 8/1976 | Nakajima | 277/59 X |
| 4,019,749 | 4/1977 | Dawson et al. | 277/58 |

Primary Examiner—Robert S. Ward, Jr.
Attorney, Agent, or Firm—Haseltine and Lake

[57] ABSTRACT

The device is constituted by a seal-bearing ring 21 disposed about the flange 2 of the component 5 and resting on the plate 1 of the reactor, having a first set of annular seals 26,27 ensuring sealing between the inner side surface of the seal-bearing ring 21 and the outer side surface of the flange 2 of the component 5 and a second set of annular seals 23,24 ensuring sealing between the base surface of the seal-bearing ring 21 and the plate 1 of the primary vessel. The device also includes a means 32–34 for applying a vertical force downwards on the seal bearing ring 21 and a means 16,18 of injecting an isolating gas between the flange 2 of the component 5 and the plate 1 of the primary vessel on which the component 5 rests. The device is especially useful for sealed mounting of components within vessels of fast neutron nuclear reactors.

7 Claims, 2 Drawing Figures

SEALING DEVICE FOR A COMPONENT VERTICALLY DISPOSED WITHIN THE PRIMARY VESSEL OF A NUCLEAR REACTOR

FIELD OF THE INVENTION

The invention concerns a sealing device for a component vertically disposed within the primary vessel of a nuclear reactor.

BACKGROUND OF THE INVENTION

In fast neutron nuclear reactors, the vessel is closed by a very thick horizontal plate pierced by a certain number of apertures through which pass the components of the reactor which are generally vertically disposed within the vessel.

At their upper part these components have a flange, of larger diameter than the diameter of the component, which, when the component is installed, centers in a seating of circular section provided inside the plate of the reactor. The flange nevertheless remains projecting above the upper surface of the plate of the reactor and the component is held in place by means of a flange, termed an "anti-flyoff" flange, one part of which bears on the upper horizontal surface of the flange of the component and another part of which is fixed by screws to the plate of the reactor.

Some of the components introduced vertically into the reactor vessel have very large dimensions and rest on the plate of the reactor via a flange whose outer diameter is about 3 m for fast neutron nuclear reactors as currently made. Examples of these components, termed "large components", are the primary pump, the intermediate exchanger and the pre-heating pipe for the heat transfer fluid which, in the case of fast neutron nuclear reactors, is generally liquid sodium.

Other components, termed "average components", have an outer flange-diameter of between 1 and 2 m. Examples of these are the integrated purifying apparatus for the heat transfer fluid, the sampling pump, the purification installation pump and the plugs giving access to the fuel.

Lastly, other components, termed "small components", have a diameter of less than one meter and are mounted in very great numbers on the plate of the reactor. A great many of these components constitute the instrumentation which it is necessary to dispose inside the vessel to carry out the various measurements or samplings in the reactor.

All of these components obviously have to be fixed sealingly onto the plate of the reactor so as to avoid liquid sodium vapor escaping from the vessel, on the one hand, and so as to avoid all radio-active contamination in the neighborhood of the vessel on the other hand. Sealing between the flanges of the components and the plate of the reactor has been achieved hitherto by the interposition of O rings between the lower surface of the flange and the upper surface of the seating in the plate in which this flange is positioned.

These sealing devices constituted by two O rings disposed concentrically around the component between the flange of the component and the plate of the reactor present disadvantages for which there has been no remedy hitherto.

For example, the flanges of large and average components whose diameter can be around two or three meters often present faults in flatness entailing faulty sealing of the device with O rings. These faults in flatness are inherent in the method of manufacturing these components and can be due for example to stresses produced in the component by welding.

Also, the large components are constructed in the horizontal position and when they are erected in order to be put into the vertical position in the reactor vessel, these components suffer a certain deformation which makes it very difficult to obtain a plane which is truly perpendicular to the axis of the component since, at the moment when this flange plane is established, the component is in the horizontal position.

In the case of nuclear reactors as currently made, this inclination of the flange plane to the axis of the component must be allowed for when it is sealed on being installed on the plate of the reactor.

Furthermore, with most nuclear reactor components, handling other than that necessary for positioning the component at the time of the reactor's construction occurs. During this handling, difficulties arise when the components are put back in position on the plate of the reactor, with interposition of the sealing O rings.

For example, the presence of condensates has been established, resulting from sodium vapor rising up the vents of components while the reactor is working, reaching the first O ring ensuring sealing and condensing on this seal.

Also, when the component is removed, particles of sodium oxide disposed in the annular seating provided in the plate sometimes fall on the seal seatings for locating the sealing O rings.

The condensates or the deposits on the seals are obviously deterimental to the correct repositioning of the components and are the cause of sealing faults.

In addition, removal, operations on the reactor components and remounting of these components gradually bring about a degradation in the state of the surface originally provided for supporting the seals and can be the reason why sealing faults gradually appear.

When a sealing fault is established, it is necessary to carry out extraction of the component in order to be able to change the seals and clean the seal seatings with special equipment comprising a protection plug and a special cleaning lock chamber so as to avoid contamination from contact with the environment of the reactor.

When the component is put back in position, particles from the handling head of the component can become disposed on the seal seatings and the new seals can become damaged in their turn.

Furthermore, sealing devices are known for elements which remain fixed on the plate of the reactor, constituted by a seal-bearing ring comprising two sets of seals, one of which effects sealing between the side faces of the ring and the element and the other of which effects sealing between the plate of the reactor and the lower surface of the seal-bearing ring. Such devices, however are not removable for easy fitting and removal of the element.

OBJECT OF THE INVENTION

Consequently, the object of the invention is to propose a sealing device for a component vertically disposed within the primary vessel of a nuclear reactor resting by its upper cylindrical part forming a flange whose diameter is greater than the diameter of the component, on the horizontal closing plate of the primary vessel around the hole for the component to pass through the plate and held in place by an annular flange termed an anti-flyoff flange one part of which rests on the upper surface of the flange of the component and another part of which has devices for fixing and clamping the flange of the component on the plate, comprising a seal-bearing ring disposed around the flange of the component and resting on the plate of the reactor below the anti-flyoff flange, on which are disposed a first set of annular seals ensuring sealing between the inner side surface of the seal-bearing ring and the outer side surface of the flange of the component at the part thereof located above the plate and a second set of annular seals ensuring sealing between the base surface of the ring and the plate, this sealing device allowing all escape of sodium in vapor form or any other radio-active substance from the reactor vessel to be avoided, during the working of the reactor as well as during maintenance operations for this reactor, rapid and wholly safe changing of components and preservation of the integrity of the seal seatings of the sealing device, whatever operations are carried out on the component.

SUMMARY OF THE INVENTION

To this end, the sealing device according to the invention is entirely removable for fitting and removal of the component and also comprises:

a means for applying a backing force vertically downwards on the seal-bearing ring fixed on the anti-flyoff flange at the part thereof located above the seal-bearing ring, and a means of injecting an isolating gas between the flange of the component and the plate to ensure isolation of the interior of the vessel independently of the seals of the seal-bearing ring.

BRIEF DESCRIPTION OF THE DRAWINGS

In order that the invention may be fully understood, two embodiments of a sealing device according to the invention will now be described by way of non-limiting example, on the one hand with reference to large or average components and on the other hand with reference to small components.

DETAILED DESCRIPTION

Figure 1:
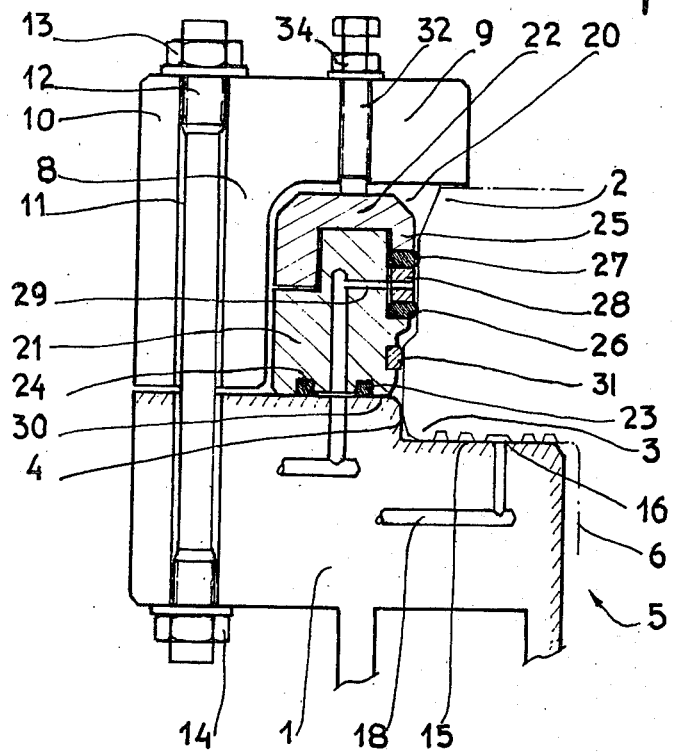
FIG. 1 represents a sectional half-view of a sealing device according to the invention applied in the case of a large or average component.

In FIG. 1, the plate 1 of the nuclear reactor is shown, on which rests the flange 2 of a component of the nuclear reactor inside a seating 3 provided in the plate 1, cylindrical in shape and with an external side surface 4 ensuring centered of the flange 2 by its external side surface.

When it is installed in the reactor, the component is thus automatically centered within the seating 3 so that the component 5 itself, whose diameter is less than the diameter of the flange 2, is centered within the passage-hole 6 within the plate of the reactor.

The component is held in position by an anti-flyoff flange 8, annular in shape and bearing at its smaller part 9 on the cylindrical flange of the component 5.

In its outer part 10, the anit-flyoff flange has holes 11 for the passage of screws 12 provided with nuts 13 and 14 for fixing and clamping the anti-flyoff flange on the flange 2 of the component 5.

The lower surface 15 of the flange 2 which bears on the bottom of the seating 3 provided in the plate of the reactor is machined to form a labyrinth 16 whose central part is connected to a conduit 18 connected to a source of argon which is not represented.

The labyrinth 16 and the means 18 for blowing in argon constitute the device for isolating the interior of the reactor vessel independently of the seals.

Between the upper surface of the plate 1, the flange 2 of the component and the anti-flyoff flange, an annular space 20 is provided inside which are disposed a seal-bearing ring 21 and a clamping ring 22 disposed one above the other, below the inner part 9 of the anti-flyoff flange 8.

The seal-bearing ring 21 has on its lower surface two seal seatings allowing the interposition of annular seals 23 and 24 between the seal-bearing ring 21 and the upper surface 30 of the plate 1.

On the inner side surface of the seal-bearing ring, a seal seating 25 is also machined inside which are disposed two annular seals 26 and 27 separated by a spacing ring 28. At the level of this ring, at the central part of this seal seating 25, a conduit 29 opens, connected to a source of argon allowing the injection of this argon into the region disposed between the seals 26 and 27 of the seal seating 25. This device 29 for blowing in argon allows the seals to be tested by precise measurement of the pressure and flow of the argon in the conduit 29. The intermediate ring 28 allows the spacing between the seals to be maintained and presents apertures for blowing in argon.

The seal-bearing ring 21 also includes a centering pad 31, annular in shape, with a spherical inner surface, allowing perfect centering of the seal-bearing ring around the flange of the component which is itself centered inside the seating 3 provided in the plate of the reactor.

In transverse section, the clamping ring 22 has a profile allowing its perfect centering on the seal-bearing ring 21 on the one hand and the introduction of its inner rim into the seal-bearing ring 25 on the other, so that this inner rim can exert a pressure on the seal 27 and, via the intermediate ring 28, on the seal 26.

The pressure on the clamping ring is exerted by a set of screws 32 engaging with a threading provided in the part 9 of the anti-flyoff flange, regularly spaced on the part 9 of the anit-flyoff flange. Each of the screws 32 is provided with a nut 34 for locking when the even clamping of the flange 22 has been achieved by screwing the screws 32 into the corresponding threadings in the anti-flyoff flange.

The set of screws 32 and their locking nuts 34 constitutes the means for applying the backing force vertically downwards on the seal-bearing ring.

Figure 2:
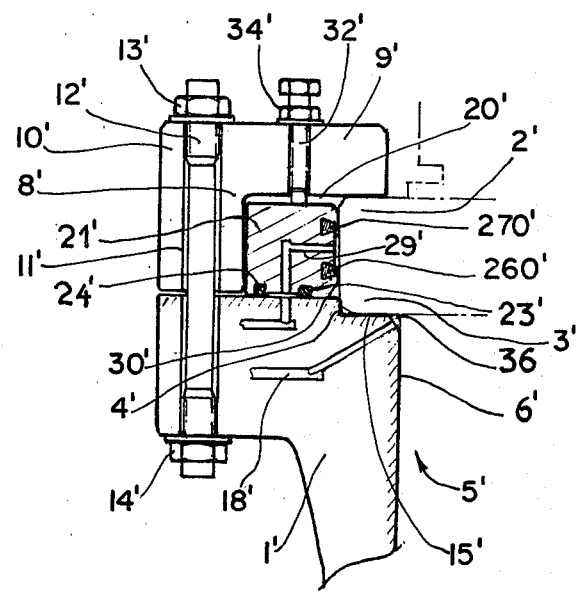
FIG. 2 represents a sectional half-view of a simplified sealing device applied in the case of a small component.

With reference to FIG. 2, in which the corresponding references indicate elements equivalent to those of FIG. 1, certain differences in structure will be noted arising from a simplification of the parts constituting the sealing device in the case of this device being applied to small components.

Firstly, with regard to the centering of the component, this is effected by the passage-hole 6' for the component itself and not by the side surface bounding the seating 3' of the flange of the component.

In addition, the O rings 26' and 27' ensuring sealing between the seal-bearing ring and the flange 2' of the component 5' are disposed inside seatings separately machined inside the seal-bearing ring.

The conduit for blowing in argon opens between these two seals in the space between the seal-bearing ring and the flange 2' of the component 5'.

As in the previous instance, this conduit 29 ensures that argon is blown into the space between the seals 260 and 270 and into the space between the seals 23' and 24' simultaneously.

In addition, the conduit 18' for blowing in argon does not open into a labyrinth 16 as previously but into a space 36 provided between a chamfer machined on the passage flange of the plate 1' and the component.

In addition, the seals 26' and 27' are made in the shape of segments disposed in the seal-bearing ring, without a clamping ring such as 22 represented in FIG. 1 being necessary, and the screws 32' bear directly on the upper surface of the seal-bearing ring 21'.

When the seal-bearing ring is put in position around the component, the seals effect sealing against the outer side surface of the flange 2' of this component.

An operation for changing the seals of a sealing device according to the invention will now be described, where this device is that represented in FIG. 1, i.e. in the case of a sealing device used for large or average components.

From the beginning of the seal-changing operation and throughout this operation, barrier argon is blown into the labyrinth 16 via the argon-blowing conduit 18.

The operation begins with removal of the anti-flyoff flange 18 by unscrewing the nuts 13 or 14 which keep this flange tight against the flange of the component, and then the seal-bearing ring which is freed when the anti-flyoff flange has been removed is removed.

Then the seals can be removed, the seal seatings cleaned and these seals changed quite safely since the argon barrier provided in the labyrinth 16, through the conduit 18, prevents any sodium vapour from escaping. This can be done without removing the component and without lifting its flange above the plate of the reactor, which was not the case with devices of the prior art.

The seal-bearing ring is put back in position and then the anti-flyoff flange above this seal-bearing ring and its locking is ensured by means of the screws 32 and the nuts 34. Then a test of the sealing by the seals is made and, if this test is satisfactory, blowing of barrier argon into the labyrinth 16 is stopped.

It is thus clear that the changing of seals in a device according to the invention is particularly easy and quick.

It may also be noted that testing of the seals is permanently ensured by blowing argon into the conduit 29, i.e. into the spaces provided between the lower and side seals and continual recording of the pressure and flow of argon.

Similarly, with the operations of installing or removing a component which necessitate the use of a special handling head which is connected to a lock chamber positioned above the component, the operations are greatly facilitated by disposing the seals outside a barrier obtained by blowing argon into a labyrinth preventing the escape of contaminated vapor from the reactor vessel.

The device according to the invention in fact allows direct access to the seals, after removal of the special handling head and the lock chamber.

In devices of the prior art, where the seals were inserted between the flange of the component and the plate of the reactor, i.e. at the location of the labyrinth 16 of the device according to the invention, these seals constituted the only barrier between the interior of the reactor vessel and the outer atmosphere. When changing the seals or components, it was necessary to use a special head installed above the component during the installing of the seals and if sealing was not obtained by means of these seals. The device according to the invention makes this requirement unnecessary.

It is therefore clear that the principal advantages of the device according to the invention are that sealing of the components with respect to the nuclear reactor vessel is improved and in particular the poor support of the seals due to buckling of the flanges in the case of components which are of large diameter and are very thick is avoided, the operations of changing seals and cleaning seal seatings are greatly facilitated and deterioration of the seals and the seal seatings is avoided during the operations of fitting and removing the components.

But the invention is not limited to the embodiments described; it also includes all the variants thereof and points of detail can be modified without going beyond the scope of the invention thereby.

Thus, instead of a labyrinth into which argon is blown, any device for blowing argon in between the flange of the component and the upper surface of the plate of the nuclear reactor can be envisaged. Instead of argon, any other isolating gas can obviously be blown in, allowing the sodium vapors inside the nuclear reactor vessel to be driven back.

Clamping of the seal-bearing ring by the use of a clamping ring or directly by any appropriate means can also be envisaged.

It is also possible to envisage any sort of arrangement of seals in the seal-bearing ring and the invention is not limited to the two embodiments described.

Lastly, the sealing device according to the invention applies to the fitting of any component in a nuclear reactor vessel or primary vessel, whether this reactor is for example a fast neutron reactor, a gas-graphite reactor, a high temperature reactor or other type of reactor.

What is claimed is:

1. A sealing device for a component vertically disposed within a primary vessel of a nuclear reactor and having an upper cylindrical part forming a flange whose diameter is greater than the diameter of the component, said component resting by said flange on a horizontal closing plate of the primary vessel around a hole for the component to pass through the plate and held in place by an annular anti-flyoff flange, one part of which rests on the upper surface of the flange of the component and another part of which has devices for fixing and clamping the flange of the component on the plate, said sealing device comprising:
   (1) a seal-bearing ring disposed around the flange of the component and resting on the plate of the reactor below the anti-flyoff flange;
   (2) a first set of annular seals disposed on said sealing ring ensuring sealing between the inner side surface of the seal-bearing ring and the outer side surface of the flange of the component at the part thereof located above the plate;
   (3) a second set of annular seals ensuring sealing between the base surface of the ring and the plate;
   (4) a clamping ring disposed above the seal-bearing ring includes an inner rim coming to bear at the interior of a seal-bearing seating disposed between the seal-bearing ring and the flane of the component, on at least one of the seals for applying pressure on this seal allowing its radial dilatation;

(5) a means for applying a backing force vertically downward on the clamping ring and thus on the seal-bearing ring, fixed on the anti-flyoff flange at the part thereof located above the seal-bearing ring; and (6) a means for injecting an isolating gas between the flange of the component and the plate to ensure isolation of the interior of the vessel independently of the seals of the seal-bearing ring, said sealing device being entirely removalble for fitting and removal of the component.

2. The sealing device according to claim 1, wherein each of the sets of seals of the seal-bearing ring includes at least two seals between which opens a tube for blowing in a gas to test the sealing of the seals.

3. The sealing device according to any one of claims 1 and 2 wherein the means for applying a backing force vertically downward on the seal-bearing ring comprises a set of screws engaging with threadings passing through the anti-flyoff flange, coming into contact with their lower parts with a surface for applying the backing force to the clamping ring and provided with locking nuts.

4. The sealing device according to any one of claims 1 and 2, wherein the means of injecting isolating gas between the flange of the component and the plate comprises a labyrinth machined on the lower surface of the anti-flyoff flange which comes to bear on the plate within which a supply channel for an isolating gas opens.

5. Sealing device according to calim 1, characterised by the fact that each of the sets of seals 23-24-26-27 of the seal-bearing ring 21 includes at least two seals between which opens a tube 29 for blowing in a gas to test the sealing of the seals 23-24-26-27.

6. Sealing device according to any one of claims 1, 2 and 3 characterised by the fact that the means 32-34 for applying a backing force vertically downward on the seal-bearing ring 21 is constituted by a set of screws 32 engaging with threadings passing through the anti-flyoff flange 8, coming into contact with their lower parts with a surface for applying the backing force to the clamping ring 22 and provided with locking nuts 34.

7. Sealing device according to any one of claims 1, 2 and 3, characterised by the fact that the means of injecting isolating gas between the flange 2 of the component 5 and the plate 1 is constituted by a labyrinth 16 machined on the lower surface 15 of the flange 8 which comes to bear on the plate 1 within which a supply channel 18 for an isolating gas opens.

* * * * *